United States Patent
Liu et al.

(10) Patent No.: US 9,379,751 B2
(45) Date of Patent: Jun. 28, 2016

(54) NOISE CANCELING SYSTEM AND METHOD, SMART CONTROL METHOD AND DEVICE AND COMMUNICATION EQUIPMENT

(75) Inventors: Song Liu, Shandong (CN); Jian Zhao, Shandong (CN); Shasha Lou, Shandong (CN)

(73) Assignee: GOERTEK INC. (CN)

( * ) Notice: Subject to any disclaimer, the term of this patent is extended or adjusted under 35 U.S.C. 154(b) by 190 days.

(21) Appl. No.: 14/119,611

(22) PCT Filed: Nov. 8, 2011

(86) PCT No.: PCT/CN2011/081930
§ 371 (c)(1),
(2), (4) Date: Nov. 22, 2013

(87) PCT Pub. No.: WO2013/033946
PCT Pub. Date: Mar. 14, 2013

(65) Prior Publication Data
US 2014/0141724 A1   May 22, 2014

(30) Foreign Application Priority Data
Sep. 10, 2011   (CN) .......................... 2011 1 0267999

(51) Int. Cl.
*A61F 11/06* (2006.01)
*G10K 11/16* (2006.01)
(Continued)

(52) U.S. Cl.
CPC ................ *H04B 1/12* (2013.01); *H04R 1/1083* (2013.01); *H04R 3/02* (2013.01); *H04R 2410/05* (2013.01); *H04R 2460/01* (2013.01); *H04R 2499/13* (2013.01)

(58) Field of Classification Search
CPC .... H04R 1/1083; H04R 2460/01; H04R 3/02; H04R 2410/05; H04R 2499/13

USPC ........... 381/71.6, 74, 71.1, 94.1, 72, 56, 370, 381/58, 317
See application file for complete search history.

(56) References Cited

U.S. PATENT DOCUMENTS

| 7,031,460 | B1 | 4/2006 | Zheng |
| 2009/0123003 | A1 | 5/2009 | Sibbald |
| 2010/0061564 | A1* | 3/2010 | Clemow et al. ............. 381/71.6 |

FOREIGN PATENT DOCUMENTS

| CN | 1700305 A | 11/2005 |
| CN | 101365259 A | 2/2009 |

(Continued)

OTHER PUBLICATIONS

Chinese Office Action for application No. CN201110267999.2 dated Jun. 27, 2014, citing the above references.
(Continued)

*Primary Examiner* — Paul S Kim
(74) *Attorney, Agent, or Firm* — Hauptman Ham, LLP

(57) ABSTRACT

The present invention discloses a noise canceling system and method, a smart control method and device and a communication equipment. Said smart control method includes: when it is detected there is no voice signal output at a receiving end of a communication equipment, receiving an outside noise signal from a reference microphone away from ears and a detection signal from a monitoring microphone near ears; implementing performance analysis on said received outside noise signal and said detection signal to estimate a noise reduction performance curve after said feed-forward active noise cancellation; and regulating parameters of the control circuit in said feed-forward active noise cancellation according to said estimated noise reduction performance curve and the preset noise reduction performance curve to make a difference between said estimated noise reduction performance curve and said preset noise reduction performance curve within a preset range.

12 Claims, 7 Drawing Sheets

(51) Int. Cl.
*H03B 29/00* (2006.01)
*H04B 1/12* (2006.01)
*H04R 1/10* (2006.01)
*H04R 3/02* (2006.01)

(56) References Cited

FOREIGN PATENT DOCUMENTS

| CN | 101375328 A | 2/2009 |
|---|---|---|
| CN | 101989423 A | 3/2011 |
| EP | 2320674 A1 | 5/2011 |
| JP | 2000-59876 A | 2/2000 |
| JP | 2003520469 A | 7/2003 |
| JP | 2009251134 A | 10/2009 |
| JP | 2009535655 A | 10/2009 |
| JP | 2010-268188 A | 11/2010 |

OTHER PUBLICATIONS

Korean Notice of Allowance for patent application No. KR10-2013-7021791 dated Aug. 13, 2014, citing the above . reference(s).
Japanese Office Action for application No. 2013-552087 dated Jan. 9, 2014, citing the above reference(s).
International Search Report mailed Jun. 14, 2012 for PCT/CN2011/081930, citing the above reference(s).
European search report for application No. 11872107.5 dated Nov. 11, 2014, citing the above reference(s).

\* cited by examiner

NOISE CANCELING SYSTEM AND METHOD, SMART CONTROL METHOD AND DEVICE AND COMMUNICATION EQUIPMENT

CROSS REFERENCE TO RELATED APPLICATION

This application claims the priority of Chinese Patent Application No. 201110267999.2, filed on Sep. 10, 2011 in the SIPO (State Intellectual Property Office of the P.R.C). Further, this application is the National Phase application of International Application No. PCT/CN2011/081930 filed Nov. 8, 2011, which designates the U.S. and was published in Chinese.

FIELD OF THE INVENTION

The present invention relates to the field of noise cancellation at receiving end of a communication equipment, more particularly, to a non-closed feed-forward active noise canceling system, a non-closed active noise canceling method, an smart control method and device used in non-closed feed-forward active noise cancellation and a communication equipment with the above-mentioned non-closed feed-forward active noise canceling system.

BACKGROUND

Advancement of informatization allows people to communicate at any moment and everywhere. Extensive use of various communication equipments such as handsets, blue tooth earphone and stereo headphone and communication technologies greatly facilitate people's life and increase work efficiency. However, the social development results in a severe issue, that is, noises. In a noisy environment, definition and intelligibility of communication voice are severely compromised and when noise is high to a certain degree, communication can not proceed, and people's audition and physical and mental health will be hurt.

For communication under strong noise background, prior art solution conducts speech enhancement and noise reduction processing in terms of the following aspects: one the one hand, acoustics signal processing technologies are applied at the sending end of the communication equipment to increase SNR of speech signals picked by the microphone, allowing a remote user to hear proximal user's talking; on the other hand, it is required to enhance SNR of speech at receiving end of the communication equipment, allowing proximal end to hear speech signal sent by remote user clearly.

However, increasing SNR of speech at receiving end has always been a difficulty in the art. In order to increase SNR of speech at the receiving end, two methods have been proposed in prior art.

One method is to apply the automatic volume control technology (see China Patent Application Publication CN1507293A) in which the power delivered to speaker unit is automatically enhanced when there is much noise in the surroundings. This is a passive noise reduction processing method, and due to limitation by the power of speaker unit itself and the sound pressure fed into ear, the volume of speaker unit can not be enhanced without indefinitely. Furthermore, high intensity voice emitted by the speaker may injure user's audition and physical and mental health. Therefore, this noise reduction processing method has limited speech enhancement.

Another method is to apply traditional combined active/passive noise control technology (see China Patent Application Publications CN101432798A and CN101001481A) to a closed communication earphone. This closed earphone is classified into head-worn type and earplug type. Closed earphones typically use a structure and materials which hermetically couple with ears. In this type of closed earphones, intermediate and high frequency noise is reduced through sound absorption and isolation by the materials of the earphones, low frequency (mainly below 500 Hz) noise is effectively reduced by active noise control technology, thereby realizing sufficient noise cancellation in full band and effectively enhancing speech SNR of earphones at receiving end. However, wearing closed communication earphones for a long time makes the user feel unbalanced air-pressure between inside and outside of the ear canal. Discomfort caused by wearing this kind of earphones is a major factor that impairs the active noise reduction technique of this configuration from widespread use in communication equipments.

It is a highly demanding and yet challenging topic to realize feed-forward active noise cancellation technology to enhance sound SNR at the receiving end while ensuring communication equipments such as handsets, blue tooth earphones and stereo headphones have non-closed structures.

FIG. 1 is a schematic diagram of traditional noise cancellation at the receiving end of a communication equipment using a non-closed feed-forward active noise control technology. As shown in FIG. 1, the implementation of feed-forward active noise control system is based on the hypotheses that surrounding noise firstly propagates to the microphone and then to ears. In the case the noise propagates to the microphone 102, the propagation path will be divided into two channels. The first channel is along the acoustics channel P shown in FIG. 1 to propagate to ears in physics space, as shown in FIG. 1 by solid lines, wherein P is an acoustics transfer function of surrounding noise propagating from the microphone to ears. Another channel extends through the electronic circuits, as shown in FIG. 1 as a transport path generating anti noise from microphone 102, through speaker 104 and to ears. As shown in FIG. 1 by the broken line, it may be expressed by H and G connected in series, wherein H is the frequency response of the active noise reduction circuit and G is the transfer function from speaker to ears, which is called a secondary channel. Assuming that it is designed as P=−GH on the noise reduction frequency band, namely P and GH have same amplitude and opposite phases, then the original noise and antinoise propagating via the two channels respectively superimpose to be balanced out at ears, thereby realizing noise reduction.

In order to design the acoustics channel P, a frequency response of the active noise reduction circuits and the transfer function G from speaker to ears to meet the requirement, P=−GH, it generally needs to design and process the front and rear chamber of the speaker, e.g., to adjust the dimension of the front and rear chamber and the size of the opening, so as to change the transfer function G from speaker unit, so that noise is complete canceled upon one noise cancellation process.

The major problem in implementation of communication systems that adopt non-closed feed-forward noise cancellation is that the acoustics channel P and the secondary channel G may vary depending on coupling state of communication equipments and ears. With the frequency response H of the circuit part remaining constant, noise reduction performance realized when different people use it or the same people use it at different times are inconsistent, that is, some times noise reduction performance is good, sometimes deteriorated, or even no noise reduction effect is felt at all.

For the purpose of comfort when wearing earphones and consistency in noise reduction, China Patent Application Publication CN101432798A proposes a technical solution for improving the structure of earphones, in which, the coupling between earphones and ears are adjusted so as to achieve comfort and consistency in noise reduction. FIG. 2a illustrates a possible structure of the in-ear portion of a non-closed earphone that penetrates the ear, which has a small tapered end portion penetrating into the ear. By making the small tapered end portion penetrate into the ear, the propagating path become shortened between the speaker and the human ear, so that it guarantees that the acoustics transfer function for different people wearing the earphones has excellent consistency. FIG. 2b illustrates another technical solution for improving the structure of earphones. In the acoustics structure shown in FIG. 2b, two sound-passing grooves are disposed at the upper and lower portions of the in-ear portion of the non-closed earphone, so as to ensure a certain degree of sound leakage whether the earphones are tightly or loosely worn or no matter the earphones are coupled with ears of different sizes. Therefore, the structure shown in FIG. 2b not only ensure comfortability but also excellent consistency of P function and G function for different people wearing the earphone. Yet the solutions illustrated in FIGS. 2a and 2b achieve the consistency in noise reduction by changing the structure of an earphone, though the change in structure makes some progress, it can not fundamentally solve the problem of in-consistency in noise reduction effect applying the non-closed forward-feed noise reduction technology to a communication equipment.

Methods for addressing this inconsistent noise reduction performance are at present mainly self adapting active noise cancellation by DSP (digital signal processing), but there are two limitations for this technology to be applied to communication equipments such as handsets, non-closed blue tooth, stereo headphones. On one hand, the feed-forward adaptive noise canceling algorithm uses FX-LMS algorithm, which needs to recognize the secondary channel G to obtain Ĝ. The error in recognition of the secondary channel will influence system stability directly, and the secondary channel G itself may vary greatly during operation of the above-mentioned non-closed communication system, therefore it is difficult to guarantee algorithm stability. On the other hand, for communication equipments such as handsets, non-closed blue tooth and stereo headphones, due to the volume limitation of equipments themselves, the time delay of acoustics channel P is very small, if DSP is used for adaptive noise cancellation, there is a very high requirements on sampling rate of the system, and the system power consumption and frequency band for noise reduction are both limited greatly.

SUMMARY

In view of the above problem, one object of the present invention is to provide an smart control method and system for non-closed feed-forward active noise cancellation, more particularly, to a non-closed feed-forward active noise cancellation technology for applying smart control over a receiving end of the communication equipment worn on ears, in which a monitoring microphone is mounted at where the communication equipment is near ears to estimate the noise reduction performance under current coupling state and to regulate parameters of the control circuit during feed-forward active noise cancellation with an intelligent feedback control technology, so as to effectively reduce external environment noise at ears, achieving optimal noise reduction performance, thereby ensuring that the non-closed feed-forward active noise cancellation technology can be effectively applied to the receiving end of the communication equipment, enhancing voice SNR at the receiving end of the communication equipment and realizing speech enhancement effect at the receiving end.

According to one aspect of the present invention, there is provided an smart control method for non-closed feed-forward active noise cancellation comprising: when it is detected there is no voice signal output at a receiving end of a communication equipment, receiving an outside noise signal from a reference microphone away from ears and a detection signal from a monitoring microphone near ears; implementing performance analysis on said received outside noise signal and said detection signal to estimate a noise reduction performance curve resulted from said feed-forward active noise cancellation; and regulating parameters of the control circuit during said feed-forward active noise cancellation according to said estimated noise reduction performance curve and the preset noise reduction performance curve, so as to make a difference between said estimated noise reduction performance curve and said preset noise reduction performance curve within a preset range.

Furthermore, in one or more embodiments, the step of regulating parameters of the control circuit during said feed-forward active noise cancellation according to said estimated noise reduction performance curve and the preset noise reduction performance curve may comprises: comparing said estimated noise reduction performance curve and the preset noise reduction performance curve to determine in which direction the parameters of said control circuit need to be regulated; and regulating parameters of said control circuit according to the determined regulation direction, wherein, said regulation process for parameters of the control circuit applies a feedback control, and each time after regulation, comparing again whether said estimated noise reduction performance curve approaches closer to said preset noise reduction performance curve; if so, maintaining the regulation direction, if not, reversing said regulation direction, until the difference between said estimated noise reduction performance curve and said preset noise reduction performance curve is within said preset range.

According to another aspect of the present invention, there is provided an non-closed feed-forward active noise canceling method comprising: picking up an outside noise signal away from ears; subjecting the picked outside noise signal to feed-forward active noise cancellation to generate an antinoise signal for balancing out said outside noise signal; mixing the generated antinoise signal and the voice signal received at the receiving end of the communication equipment; and feeding the mixed signal into ears to balance out the outside noise signal entering ears via free space, wherein when there is no voice signal output at the receiving end of said communication equipment, the parameters of the control circuit applying said feed-forward active noise cancellation are regulated according to the above-mentioned smart control method.

According to yet another aspect of the present invention, there is provided an smart control device for non-closed feed-forward active noise cancellation comprising: a detecting unit configured to detect whether there is any voice signal output at the receiving end of the communication equipment; a receiving unit configured to, when it is detected there is no voice signal output at said receiving end of a communication equipment, receive an outside noise signal from a reference microphone away from ears and a detection signal from a monitoring microphone near ears; a noise reduction performance estimating unit configured to implement performance analysis on said received outside noise signal and said detection signal to estimate a noise reduction performance curve used for said feed-forward active noise cancellation; and a first regulating unit configured to regulate parameters of the control circuit during said feed-forward active noise cancellation according to said estimated noise reduction performance curve and the preset noise reduction performance curve, so as to make a difference between said estimated noise reduction performance curve and said preset noise reduction performance curve within a preset range.

According to yet another aspect of the present invention, there is provided an non-closed feed-forward active noise canceling system comprising: a reference microphone configured to pick up an outside noise signal away from ears; an antinoise signal generating unit configured to subject the picked outside noise signal to feed-forward active noise cancellation to generate an antinoise signal for balancing out said outside noise signal; a signal mixing unit configured to mix said antinoise signal and the voice signal received at the receiving end of said communication equipment; and a feed-in unit configured to feed the mixed signal into ears; a monitoring microphone configured to pick up the detection signal near ears, said detection signal being a signal obtained by superposing the outside noise signal entering ears via free space and the output signal of said feed-in unit; and the aforementioned smart control device configured to regulate parameters of the control circuit for feed-forward active noise cancellation implemented by said antinoise signal generating unit when there is no voice signal output at said receiving end.

According to another aspect of the present invention, there is provided a communication equipment including the aforementioned non-closed feed-forward active noise canceling system.

The above-mentioned non-closed feed-forward active noise canceling system and the smart control method and device thereof according to the present invention ensure consistency of noise reduction performance under different coupling between the communication equipment and ears by installing a monitoring microphone at a location where the communication equipment is near ears to estimate noise reduction performance under current coupling state and adding an smart control module on the non-closed feed-forward active noise canceling system.

With the present invention, under the precondition of coupling a non-closed structure with ears to guarantee comfortability, an intelligently controlled feed-forward active noise cancellation technology is implemented on the communication equipment, which can effectively enhance stability of applying the non-closed feed-forward active noise cancellation technology to the communication equipment, and avoid inconsistency in noise reduction performance due to difference in coupling between ears and the communication equipment, thereby realizing non-closed active noise cancellation effect at the receiving end of the communication equipment, greatly improving speech definition and intelligibility at the receiving end.

To achieve the above described and related objects, one or more aspects of the present invention include features that will be described in detail hereinbelow and specifically defined in claims. The following description and accompanying drawings elaborate some illustrative aspects of the present invention. However, these aspects only illustrate some of the various modes to which the principle of the present invention may be applied. Furthermore, it is intended that the present invention comprises all these aspects and their equivalents.

BRIEF DESCRIPTION OF DRAWINGS

Other purposes and results of the present invention will be more clear and easy to understand by the following description with reference to the drawings and the contents of claims. In the drawings:

Identical reference numerals indicate similar or corresponding features or functions throughout the figures.

DETAIL DESCRIPTION

The technical proposal and specific embodiments of the present invention will be described in detail below with reference to the drawings.

The non-closed feed-forward active noise canceling system and smart control method and device thereof used in communication equipments provided in the present invention are noise reduction smart control technology used at receiving end of a communication equipment in noisy environment, whose implementation includes applying an smart control technology based on reference microphone and monitoring microphone on a non-closed feed-forward noise canceling system, so as to address inconsistent noise reduction effects caused by coupling difference when applying non-closed feed-forward noise cancellation technology to communication equipments.

Figure 1:
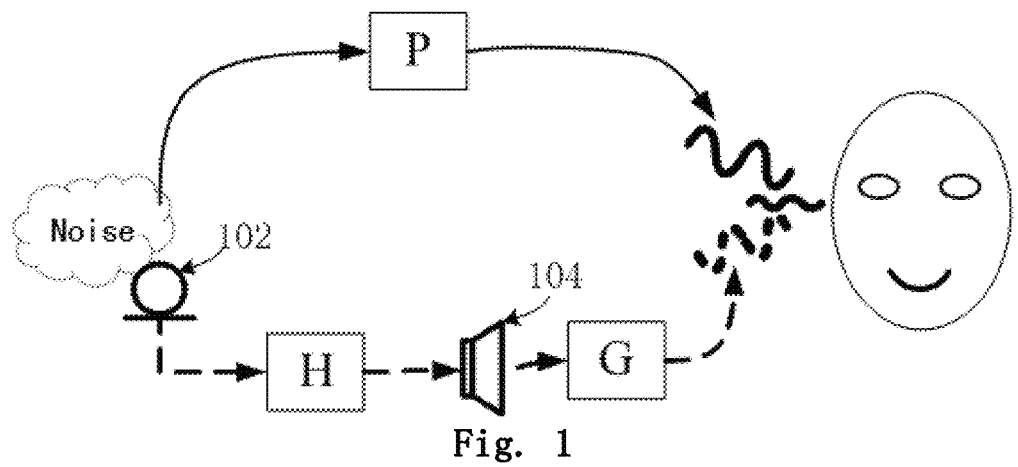
FIG. 1 is a schematic diagram of conventional noise cancellation at the receiving end of a communication equipment with non-closed feed-forward active noise control technology.

With a non-closed structure applied at receiving end of a communication equipment, this non-closed receiving end can guarantee comfortability for long time wearing compared with receiving end with an in-ear structure. The method for applying feed-forward active noise cancellation technology to non-closed communication equipments to enhance speech SNR at the receiving end is shown in FIG. 1. The outside reference noise signals picked by the reference microphone 102 located outside the auricle are magnified, antiphased and phase compensated by the circuit H to generate antinoise signals for balancing out original outside noise signals and ideally, the antinoise signals have identical amplitude and opposite phase with the original outside noise signals. The antinoise signal and the input voice signal are added in the circuit. The added composite signal is emitted by the speaker 104 directly into ears. The signal fed into ears via speaker 104 includes the antinoise signal and the voice signal. The antinoise signal and the original noise signal propagated into ears from space have identical amplitude and opposite phases and hence are balanced out, while the voice signal remain its amplitude. With this active noise canceling method, it is possible to greatly reduce noise signal and keep speech unchanged, thereby effectively enhancing SNR of speech at receiving end of a communication equipment.

Figure 3:
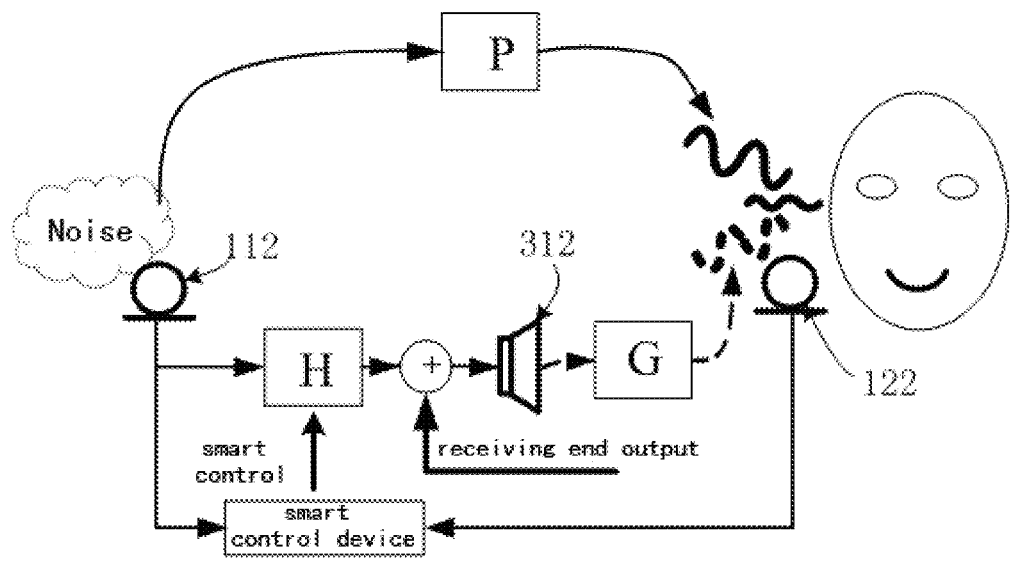
FIG. 3 is a diagram illustrating the principle of an smart control for noise reduction applying the present invention.

FIG. 3 is a schematic principle diagram of applying the smart control device for non-closed feed-forward active noise cancellation according to the present invention to the receiving end of a communication equipment for smart control of noise cancellation.

As shown in FIG. 3, compared with conventional hardware for canceling noise at receiving end of a communication equipment with feed-forward active noise control technology, the smart control system according to the present invention adds a microphone called monitoring microphone 122 at a location of the communication equipment near the ears to monitor sound pressure at the microphone 122 as a sound pressure at ears. During smart control, both signals picked by the reference microphone 112 and the monitoring microphone 122 are input into the smart control device. In one example of the present invention, the smart control device may be implemented with a DSP (digital signal Processing) module. In other examples of the present invention, the smart control device may also be implemented with other modules with digital signal processing capability.

In the present invention, when the active noise cancellation is not applied, for far field low frequency noise, energies reaching the reference microphone 112 and the monitoring microphone 122 shall be equivalent. After applying active noise cancellation, noise energy picked by the reference microphone 112 remains unchanged, while energy at the monitoring microphone 122 is a superposition of the energy of noise propagating along acoustics channel P to ears in physical space and the energy of antinoise transmitted via electronic propagating channels H and G. Due to the joining of antinoise energy, with respect to the noise energy at the reference microphone, the energy of the monitoring microphone 122 is reduced. By comparing energy difference in specific frequency band at the reference microphone 112 and the monitoring microphone 122, it is possible to determine whether the active noise cancellation is as expected. If not, the smart control device (e.g., the DSP module) outputs an smart control signal to regulate parameters of circuit H and then judge active noise cancellation effect again. With thus iteration, the intelligent feedback control makes the final active noise cancellation achieve expected noise reduction effect, thereby addressing the inconsistent noise reduction effect caused by difference in coupling between communication equipment and ears. Here, the parameters of circuit H to be regulated (namely, the control circuit parameters in feed-forward active noise cancellation processing) generally include gain system and phase adjustment parameters. Accordingly, the circuit H herein includes an amplifier and a phase adjustment unit for converting the outside noise signal picked by the reference microphone into antinoise signal that can balance out the reference noise signal. Most preferably, the antinoise signal has an amplitude identical with that of the outside noise signal and a phase opposite to that. In such a case, the noise can be canceled completely at ears of a user. In addition, the phase adjustment unit as mentioned here may include a phase compensator. In another example, said phase adjustment unit may also include an inverter and a phase compensator.

Figures 4A, 4B, 4C, 4D:
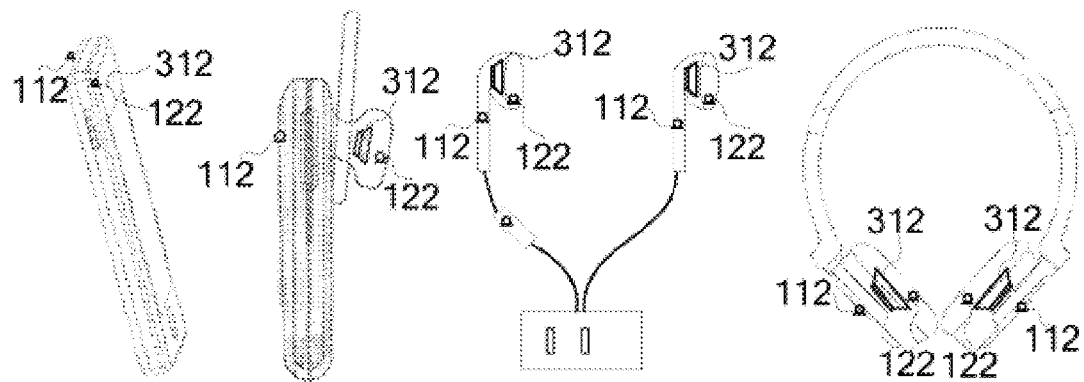
FIGS. 4a, 4b, 4c and 4d are illustrations of communication equipments to which the present invention is applied respectively.

FIGS. 4a, 4b, 4c and 4d are illustrations of communication equipments to which the present invention is applied, wherein FIG. 4a is a handset, FIG. 4b is a blue tooth earphone, FIG. 4c is an in-ear earphone and FIG. 4d is a stereo headphone.

As shown in FIGS. 4a, 4b 4c and 4d, the reference microphone 112 is generally disposed on the receiving end on the communication equipment at a location a distance away from the speaker 312, and the monitoring microphone 122 is disposed on the speaker 312 at the receiving end at a location where signals are output. In a state of being used, the reference speaker 112 is located outside the user's auricle and the monitoring microphone 122 is located inside the auricle.

When applying the non-closed communication equipment as shown in FIGS. 4a, 4b 4c and 4d, due to uses' different habit and apparent differences in ear structures, it is inevitable that there is large difference when different people or the same person at different time uses the acoustics channel P and the secondary channel G. Therefore, in order to achieve relatively consistent ideal noise reduction effect, there are different requirements on the antinoise circuit H.

Figure 5:
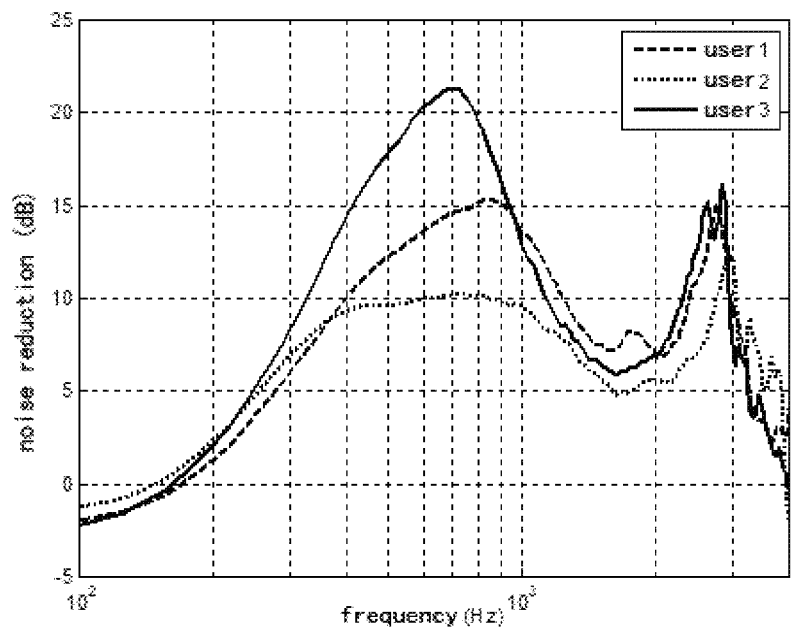
FIG. 5 shows the noise reduction effects that can be achieved for different users when applying conventional feed-forward active noise control technology.

FIG. 5 shows the noise reduction effects that can be achieved by applying conventional feed-forward active noise control technology while different users employ the same circuit H. As can be seen in FIG. 5, when using the same circuit H, 3 different users have very different noise reduction effects and the noise reduction consistency is difficult to ensure.

Since different users and a same user may have requirements, which are inevitably different somehow, on circuit H each time using the communication equipment, it is difficult to ensure consistency in noise reduction effect even when using the same circuit H, and it is necessary to adjust parameters of circuit H according to different coupling state of the communication equipment and the ears to realize equivalent noise reduction effect for different users. Corresponding to the smart control principle shown in FIG. 3, the logic framework of the feed-forward active noise cancellation system used with non-closed communication equipment according to the present invention is shown in FIG. 6.

Figure 6:
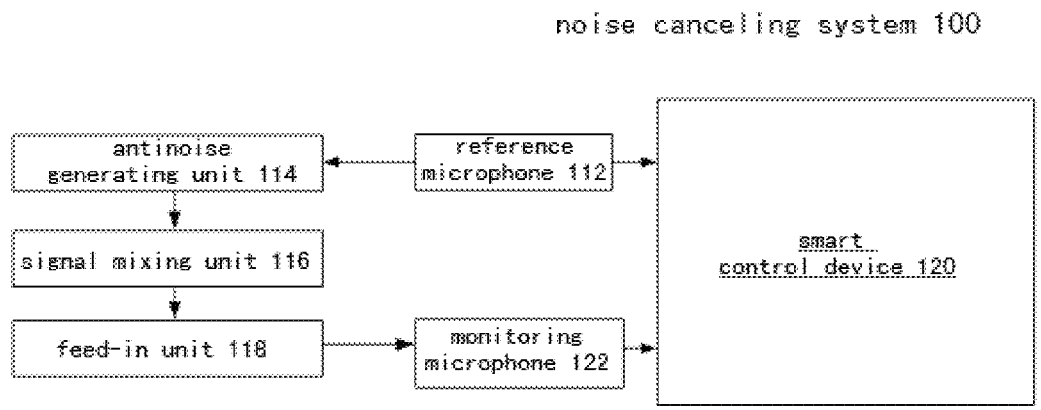
FIG. 6 shows a block diagram of an example of the non-closed feed-forward active noise canceling system according to the present invention.

FIG. 6 shows a block diagram of the noise canceling system 100 used for non-closed feed-forward active noise cancellation. As shown in FIG. 6, said noise canceling system 100 includes a reference microphone 112, a antinoise generating unit 114, a signal mixing unit 116, a feed-in unit 118, a monitoring microphone 122 and an smart control device 120.

Said reference microphone 112 is disposed away from ears, for picking up an outside noise signal away from ears, as shown in FIGS. 4a-4d. Said antinoise signal generating unit 114 is used to subject said outside noise signal to feed-forward active noise cancellation to generate an antinoise signal that can balance out said outside noise signal. Here, said antinoise signal generating unit 114 is equivalent to the circuit unit H shown in FIG. 3. The antinoise signal generating unit 114 is configured to magnify and phase compensate the outside noise signal picked by the reference microphone so as to convert the outside noise signal into an antinoise signal that can balance out, when entering ears, outside noise signal received at ears. In one example of the present invention, the antinoise signal generating unit 114 may include an amplifier (not shown) and a phase adjustment unit (not shown), wherein said amplifier is configured to gain amplify the outside noise signal from the reference microphone 112, and said phase adjustment unit is configured to phase adjust the outside noise signal from the reference microphone 112 to enable the signal subjected to phase adjustment balance the out outside noise signal. Preferably, the gain factor of said amplifier and the phase adjustment parameter of said phase adjustment unit are selected such that a signal after phase adjustment has a phase exactly opposite to that of the outside noise signal and has an amplitude equal to the outside noise signal, thereby completely balancing out the outside noise signal.

The signal mixing unit 116 is configured to be connected with the antinoise signal generating unit 114 and the receiving end of the communication equipment to receive antinoise signals output from the antinoise signal generating unit 114 and, when there is voice signal output at the receiving end, to receive the voice signal output from the receiving end and mix said antinoise signal and said voice signal output from the receiving end. Here, in one example of the present invention, said signal mixing unit 116 may be an adder.

The feed-in unit 118 is connected with the signal mixing unit 116 to feed the signal mixed by the signal mixing unit 116 into ears so as to balance out the outside noise signal entering ears via free space. In one embodiment of the present invention, said feed-in unit 118 may be a speaker. In other embodiments of the present invention, said feed-in unit 118 may also be other speech output unit.

Compared with existing feed-forward active noise cancellation systems, the feed-forward active noise cancellation system 100 according to the present invention further includes a monitoring microphone 122 and an smart control device 120. The monitoring microphone 122 and the smart control device 120 will be described in detail below.

(1) Monitoring Microphone

As shown in FIG. 6, said monitoring microphone 122 is configured to approach ears when in use for picking up detection signals near ears. Said detection signal is the signal obtained by superimposing the outside noise signal entering ears via free space and the output signal of the feed-in unit 118 at ears. Here, when there is no voice signal output from the receiving end of said communication equipment, the output signal of said feed-in unit 118 is the signal obtained by subjecting the outside noise signal to feed-forward active noise cancellation. When there is a voice signal output from the receiving end of said communication equipment, the output signal of said feed-in unit 118 is the signal obtained by superimposing the signal resultant from subjecting the outside noise signal to feed-forward active noise cancellation and the voice signal output from the receiving end of the communication equipment.

(2) Smart Control Device

Figure 7:
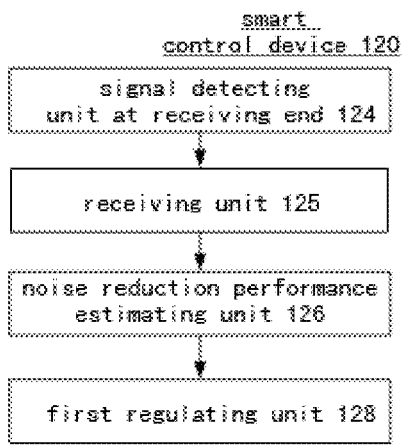
FIG. 7 shows a block diagram of the smart control device in FIG. 6.

Detail of the smart control device 120 in FIG. 6 will be explained below with reference to FIG. 7. As shown in FIG. 7, said smart control device 120 includes a detecting unit 124, a receiving unit 125, a noise reduction performance estimating unit 126 and a first regulating unit 128.

Detecting Unit

The detecting unit 124 is configured to detect whether there is any voice signal output at the receiving end of the communication equipment.

When the speaker 312 at the receiving end plays a voice signal (for example music), the signal picked by the monitoring microphone 122 includes the outside noise signal and the voice signal. Since the monitoring microphone 122 is very close to the sound emitting port of the speaker 312, the voice signal of the receiving end picked by the monitoring microphone 122 will be the dominant component. While the reference microphone 112 is relatively far away from the sound emitting port of the speaker 312 and the picked signal by the reference microphone 112 is primarily the outside noise signal. In this case, the signals picked by the two microphones are weakly correlated to each other in low frequency band and it is impossible to estimate noise reduction performance by comparing energy difference of noise components picked respectively by the reference microphone 112 and the monitoring microphone 122. When there is only noise, the outside far field noise signals picked by the reference microphone 112 and the monitoring microphone 122 are well correlated to each other in low frequency band, it is possible to estimate noise reduction performance by comparing energy difference of noise components picked respectively by the reference microphone 112 and the monitoring microphone 122.

Therefore, in the present invention, the signals at the receiving end need to be detected. Only when no voice signal output is detected at the receiving end, smart control of active noise reduction can be implemented, that is, regulating parameters of the antinoise generating unit 114 (such as circuit H) (i.e., steering circuit parameters such as gain factor and phase adjustment parameters) to allow the antinoise signal better balance out the outside noise signal entering ears, thereby optimizing noise reduction performance. When there is any voice signal output at the receiving end, the parameters of circuit H remain unchanged.

According to one embodiment of the present invention, when detecting, the detecting unit 124 may detect whether there is any voice signal output at the receiving end by calculating correlation of signals picked by the two microphones, thus determining whether to conduct smart control over the active noise cancellation. In this case, the detecting unit 124 may further include a framing sample module, a computation module and a correlation determining module (not shown in drawing). Among them, the framing sample module is configured to subject signals respectively picked by the reference microphone 112 and the monitoring microphone 122 to framing processing. The computation module is configured to calculate correlation between two frames of data after being subjected to said framing processing. The correlation determination module is configured to compare the calculated correlation between the two frames of data of the reference microphone 112 and the monitoring microphone 122 to determine the correlation of signals picked by the reference microphone and the monitoring microphone.

Particularly, as an example, during detecting signals at the receiving end, the signals picked by the reference microphone 112 and the monitoring microphone 122 are firstly subjected to framing with 512 sampling points per frame and 50% data overlapping between adjacent frames. Then calculation is conducted to obtain correlation of the two frames of data of the reference microphone 112 and the monitoring microphone 122, if the correlation is greater than one upper limit threshold (0.8 for this embodiment), it is determined there is no signal output at the receiving end and smart control over noise reduction is carried out. If the correlation is less than a lower limit threshold (0.6 for this embodiment), it is determined there is signal output at the receiving end, no smart control is implemented over noise reduction, and if the correlation is between the upper and lower limits, the last determination is maintained.

Furthermore, the detecting unit 124 may also be implemented in some other manners. For example, it is possible to determine whether there is any voice signal output at the receiving end by directly detecting energy of the output signal at the receiving end. Since the energy of the outside noise signal is relatively small, and usually below a certain threshold, when it is detected that the energy of output signal at the receiving end is greater than the threshold, it is considered there is voice signal output. Otherwise, it is considered there is no voice signal output. In this case, said detecting unit may include: an energy detecting module (not shown) for detecting the value of energy of the output signal at said receiving end; and a voice signal existence determining module (not shown) for comparing the value of the detected energy with a predetermined threshold, wherein when the value of the detected energy is greater than the predetermined threshold, said voice signal existence determining module determines there is voice signal output at said receiving end.

Receiving Unit

The receiving unit 125 is connected with the reference microphone 112 and the monitoring microphone 122 for receiving outside noise signal from the reference microphone 112 and the detection signal from the monitoring microphone 122 when it is determined there is no voice signal output at the receiving end. Here, said receiving unit 125 is controlled by said detecting unit 124 so that only when said detecting unit determines there is no voice signal output at the receiving end, said receiving unit 125 receives outside noise signal from the reference microphone 112 and antinoise signal from the monitoring microphone 122.

Noise Reduction Performance Estimating Unit

The noise reduction performance estimating unit 126 is configured to do performance analysis on the received outside noise signal and the detection signal, to estimate noise reduction performance curve after feed-forward active noise cancellation. When it is detected there is no voice signal output at the receiving end, the signal picked up by the reference microphone 112 should be outside noise, the signal picked up by the monitoring microphone 122 is a signal obtained by superposing outside noise signal and the signal obtained by subjecting outside noise signal to feed-forward active cancellation, that is, the signal wherein the noise is reduced. Therefore, in this case, it is possible to determine noise reduction performance at the monitoring microphone by comparing energies at low frequencies at the reference microphone and the monitoring microphone. Usually, said noise reduction performance estimating unit 126 does performance analysis on the received outside noise signal and detection signal in specific frequency band. In this specific frequency band, the noise reduction effect would be more clear.

Figure 10:
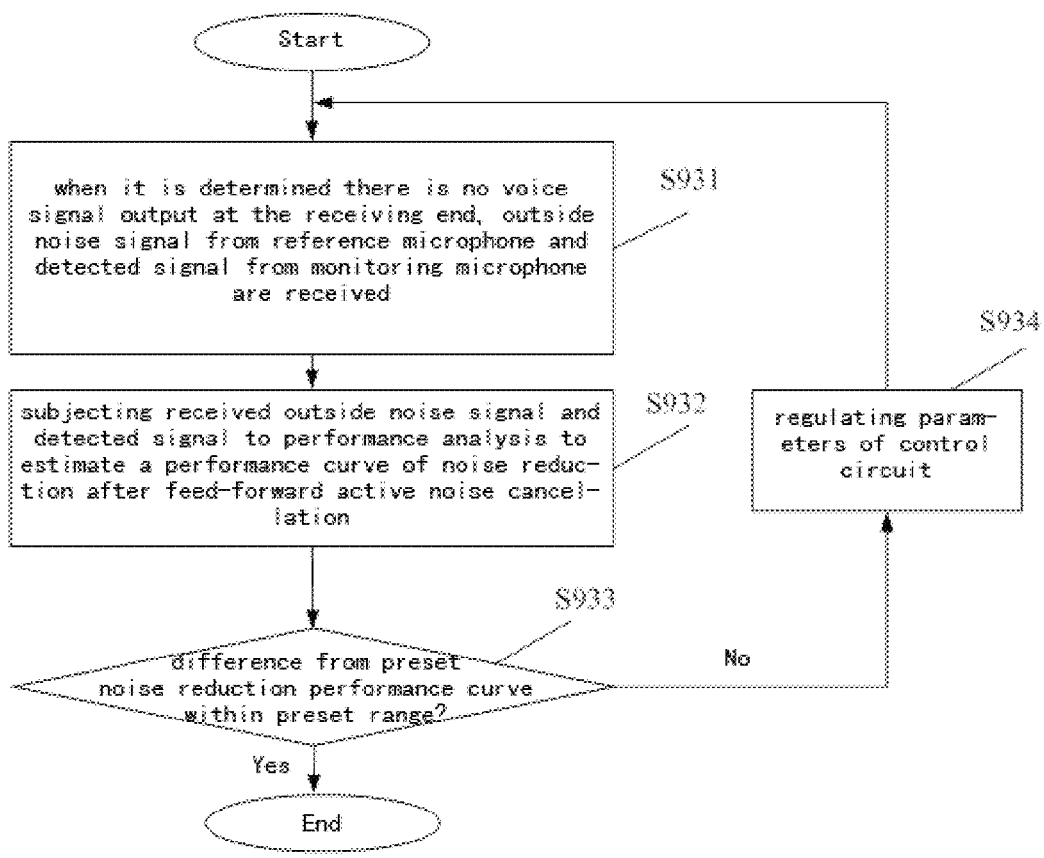
FIG. 10 shows a flow chart of an smart control method for the non-closed feed-forward active noise cancellation according to the present invention.
Figure 11:
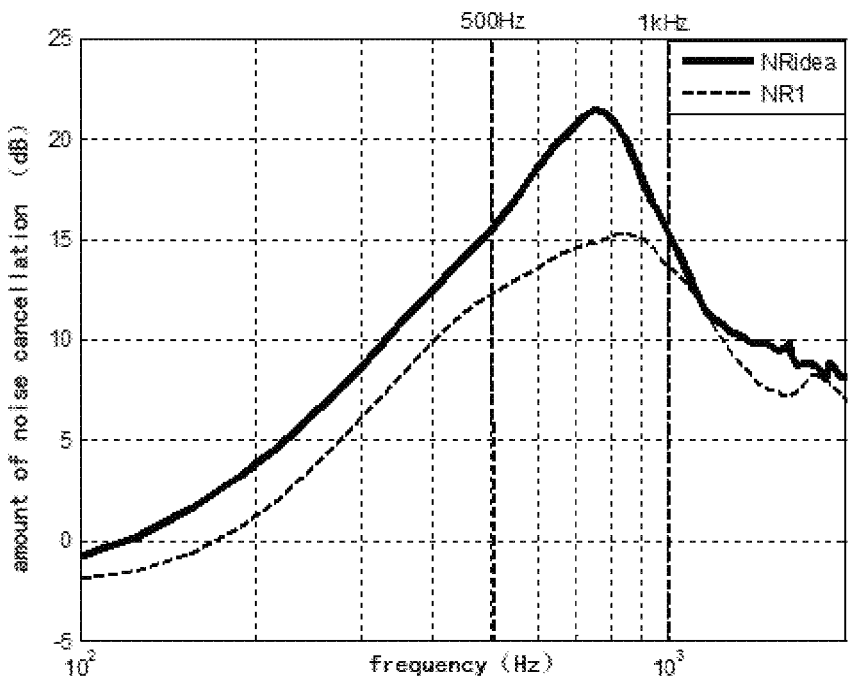
FIG. 11 is a comparison diagram of ideal and practical curves of noise reduction effects achieved by applying embodiments of the present invention.

Particularly, as an example, during estimation of the noise reduction performance, it is necessary to first set an ideal noise reduction performance curve NR_idea. FIG. 11 is a schematic diagram showing a comparison between the ideal and practical noise reduction performance curves which empty embodiments of the present invention, wherein the ideal noise reduction performance curve NR_idea is as shown in FIG. 10 by the solid line.

Figure 2A:
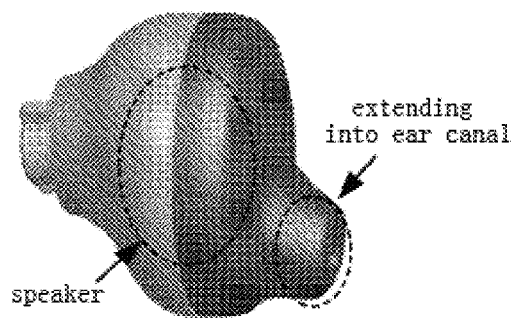
FIGS. 2a and 2b schematically illustrate the in-ear portion of a non-closed earphone.
Figure 2B:
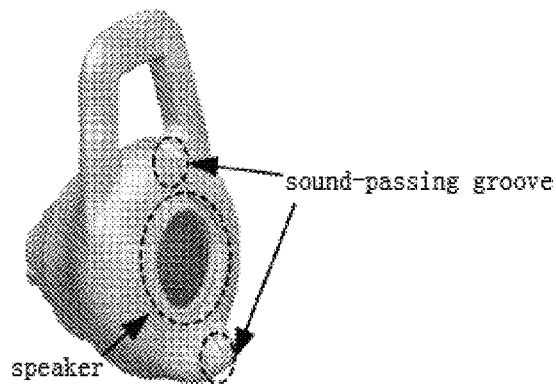

In order to reduce amount of calculation and exclude disturbance by some other factors, the present embodiment preferably only calculate noise reduction performance in the main noise reduction frequency band 500~1 kHz to estimate noise reduction performance. It is known from the principle of smart control shown in FIG. 2:

$$P - HG = \frac{E_{112}}{E_{114}} \quad (1)$$

The noise reduction performance NR is defined as:

$$NR = 20 * \log_{10}\left(\frac{E_{114}}{E_{112}}\right) = dB\left(\frac{E_{114}}{E_{112}}\right) \quad (2)$$

When H is approaching the ideal circuit H_idea, the noise reduction performance NR in 500~1 kHz frequency band will approach the ideal noise reduction performance curve NR_idea. The noise reduction performance NR1 in frequency band 500~1 kHz at any moment may be calculated by the formula (2). By comparing NR_idea and NR1, it is possible to know the difference between the present noise reduction performance and ideal noise reduction performance in 500~1 kHz frequency band, to determine whether the difference between the present circuit H and the ideal circuit H_idea lies in low frequency or high frequency part, thereby make clear general direction for adjusting circuit H's parameters, so as to make the first regulating unit 128 to regulate parameters, and by regulating frequency response (including gain and phase) of the circuit H (antinoise signal generating unit 114) to make the frequency response of circuit H approach the frequency response of ideal circuit H_idea. Wherein the following formula are used:

$$P_1 - HG_1 = \frac{1}{NR1} \quad (3)$$

$$P_1 - H_{idea}G_1 = \frac{1}{NR_{idea}} \Rightarrow \Delta NR \propto \Delta H$$

First Regulating Unit

The first regulating unit 128 is configured to regulate parameters of the control circuit (namely, the circuit parameters of the antinoise generating unit) during the feed-forward active noise cancellation processing based on the noise reduction performance curve estimated by the noise reduction performance estimating unit 126 and the preset noise reduction performance curve, to make the difference between the estimated noise reduction performance curve and the preset noise reduction performance curve within a predetermined range. Particularly, the control circuit parameters regulated by the noise reduction performance at the monitoring microphone 122 include the gain factor and the phase adjustment parameters.

According to one preferred implementation of the present invention, the first regulating unit 128 further includes a regulation direction determining module and a second regulating module (not shown). The regulation direction determining module is configured to compare the estimated noise reduction performance curve with the preset noise reduction performance curve to determine the direction in which parameters of said control circuit (namely, the circuit parameters of the antinoise generating unit) need to be regulated. The second regulating module is configured to regulate parameters of said control circuit according to the determined regulation direction.

In one example of the present invention, said second regulating module may include a gain factor regulating unit and/or a phase adjustment amount regulating unit (not shown). Among them, the gain factor regulating unit regulates gain factor of the amplifier that amplifies the outside noise signal; the phase adjustment amount regulating unit is configured to regulate the amount of phase adjustment by which the phase adjustment unit adjusts the phase of the outside noise signal. In this case, accordingly, said antinoise signal generating unit includes an amplifier and a phase adjustment unit. Furthermore, in another example of the present invention, said gain factor regulating unit and the phase adjustment amount regulating unit may also be incorporated in the second regulating module, the second regulating module conducts the above-mentioned gain factor regulation and phase adjustment amount regulation.

Furthermore, the regulation process of control circuit parameters in the feed-forward active noise cancellation adopts feedback control, each time after the parameters are regulated, the estimated noise reduction performance curve is compared with the said preset noise reduction performance curve to determine whether they are closer. If so, the regulation will be maintained in the same direction, if not, the regulation direction is reversed, until the difference between the estimated noise reduction performance curve and a preset range of the preset noise reduction performance curve is within a preset range.

Particularly, as an example, when it is determined that parameters need to be regulated, by comparing NR1 with NR_idea, it is possible to know whether high frequency part or low frequency part of circuit H needs to be regulated. But some more regulation criteria need to be established. As can be known from formula (3), $\Delta H$ and $\Delta NR$ are directly correlated, so the circuit H may be regulated based on the feedback control theory, and the adjustment process is divided into gain adjustment and phase adjustment.

Gain and phase adjustment each have two regulation directions, forward direction regulation for enhancement and backward direction regulation for decrease, if a comparison between the current noise reduction performance curve and the ideal noise reduction performance curve (namely, the preset noise reduction curve described in the description) shows that major difference is caused due to inadequacy of the amplitude by which the noise is reduced, then, then at the initial stage, the gain of the circuit needs to be regulated; if comparison between the current noise reduction performance curve and the ideal noise reduction performance curve shows that major difference is caused due to inconsistency of frequency bands where noises are reduced, the circuit phase needs to be regulated. As an example, in the initial stage of regulation, it may be attempted to regulate to lower the gain and make the phase approach 180 degree. Then, in the case of new control circuit parameter H, the noise reduction performance curve NR_new is estimated. If it is determined that, in the case where the new control circuit parameter H is adopted, the noise reduction performance curve NR_new is closer to the ideal noise reduction performance curve NR_idea than non-regulated noise reduction performance curve NR1, then the direction in which the parameters are regulated is correct, the circuit parameters are kept on being regulated in this direction. If it is determined that under new circuit parameters, the noise reduction performance curve NR_new is worse than NR1, then the initial regulation direction is wrong, the control circuit parameters are regulated in a reverse direction. After finding the correct direction, parameter adjustment in this direction may be done persistently. Each time a regulation is performed, the noise reduction performance curve NR_new under new circuit parameters will be estimated, until the difference between new noise reduction performance curve NR_new and NR_idea is within preset threshold range, then the above-mentioned regulation is stopped.

After stopping parameter regulation, real time detection on noise reduction performance NR is continued, if it is found again the noise reduction performance failed to achieve expected effect, then the function of parameter regulation may be initiated again. In addition, in extreme cases, the noise reduction performance NR_new may never achieve optimal NR_idea, then the system may be stabilized on parameters found in the regulation process for which noise reduction performance is best.

According to a specific example of the hardware, digital control capacitors and digital control resistors may be used as main filter resistors and capacitors of the antinoise generating unit (namely, the circuit H), the DSP module regulates resistance and capacitance of the circuit H via I2C or GPIO methods to achieve ideal frequency response.

Figure 8:
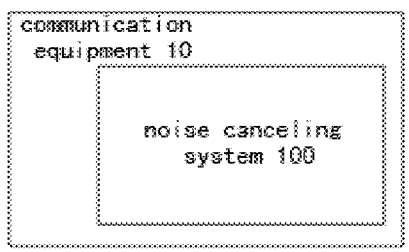
FIG. 8 shows a block diagram of an communication equipment with the non-closed feed-forward active noise canceling system according to the present invention.

FIG. 8 shows a block diagram of a communication equipment 10 with the non-closed feed-forward active noise canceling system 100 according to the present invention. The noise canceling system 100 in FIG. 8 may include various variants of the noise canceling system 100 shown in FIG. 6.

In the above, the structures of the smart control device 120, the noise canceling system 110 and the communication equipment 10 according to the present invention have been described with reference to FIGS. 3 to 8. The non-closed feed-forward active noise cancellation process and the smart control process according to the present invention will be described with reference to FIGS. 9 and 10.

Figure 9:
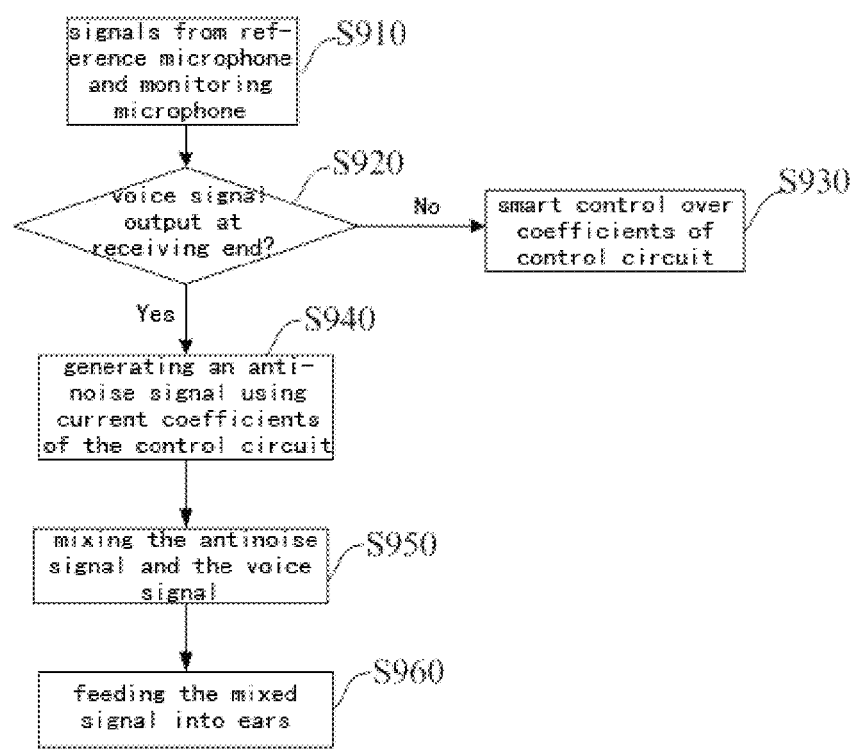
FIG. 9 shows a flow chart of a noise canceling method for the non-closed feed-forward active noise cancellation according to an embodiment of the present invention.

FIG. 9 shows a flow chart of the noise canceling method for non-closed feed-forward active noise cancellation according to an embodiment of the present invention.

As shown in FIG. 9, first, in step S910, the outside noise signal is picked up away from ears. That is, the outside noise signal is picked up by the reference microphone.

Then, in step S920, it is detected whether there is any voice signal output at the receiving end of the communication equipment. If so, the process goes to step S940. Otherwise, the process goes to step S930 in which smart control is performed on parameters of the control circuit for non-closed feed-forward active noise cancellation processing. The smart control process over the parameters of the control circuit for said feed-forward active noise cancellation processing will be described below with reference to FIG. 10.

In step S940, the picked outside noise signal is subjected to feed-forward active noise cancellation with the current parameters of the control circuit to generate an antinoise signal for balancing out outside noise signal.

Subsequently, in step S950, the generated antinoise signal is mixed with the voice signal received at the receiving end of the communication equipment.

After completing the above-mentioned mixing, in step S960, the mixed signal is fed into ears via the feed-in unit to balance out the outside noise signal entering ears via free space. So far, the non-closed feed-forward active noise cancellation process according to the present invention is completed.

FIG. 10 is a flow chart of the smart control method for non-closed feed-forward active noise cancellation according to an embodiment of the present invention.

As shown in FIG. 10, when it is detected that there is no voice signal output at the receiving end of the communication equipment, first, in step S931, an outside noise signal from the reference microphone and detected noise signal from the monitoring microphone are received. Here, said detection signal is the signal obtained by superposing, near ears, the signal generated by subjecting outside noise signal picked by said antinoise signal generating unit with current control circuit parameters to feed-forward active noise cancellation and the outside noise signal entering ears via free space. Then, after receiving the above-mentioned signal, in step S932, performance analysis is conducted on the received said outside noise signal and said detected noise signal, so as to estimate a noise reduction performance curve after feed-forward active noise cancellation.

After estimating the noise reduction performance curve which is obtained subsequent to feed-forward active noise cancellation, the parameters of the control circuit of the feed-forward active noise cancellation are regulated according to said estimated noise reduction performance curve and the preset noise reduction performance curve, to make the difference between said estimated noise reduction performance curve and the preset noise reduction performance curve within a preset range. Particularly, in step S933, said estimated noise reduction performance curve and the preset noise reduction performance curve are compared to determine whether the difference between said estimated noise reduction performance curve and the preset noise reduction performance curve is within the preset range. If the difference between said estimated noise reduction performance curve and the preset noise reduction performance curve is not within the preset range, the process goes to step S934, the parameters of the control circuit of the antinoise generating unit for feed-forward active noise cancellation are regulated. Then the process returns to step S931, regulation is continued as described above, until the difference between the estimated noise reduction performance curve and the preset noise reduction performance curve is in the preset range. Here, upon returning to S931, the received detection signal is the signal obtained by superposing, at ears, the signal generated by the antinoise signal generating unit with the regulated parameters of the control circuit and the outside noise signal entering ears via free space. If the difference between said estimated noise reduction performance curve and the preset noise reduction performance curve is within the preset range, the process ends up.

Figure 12:
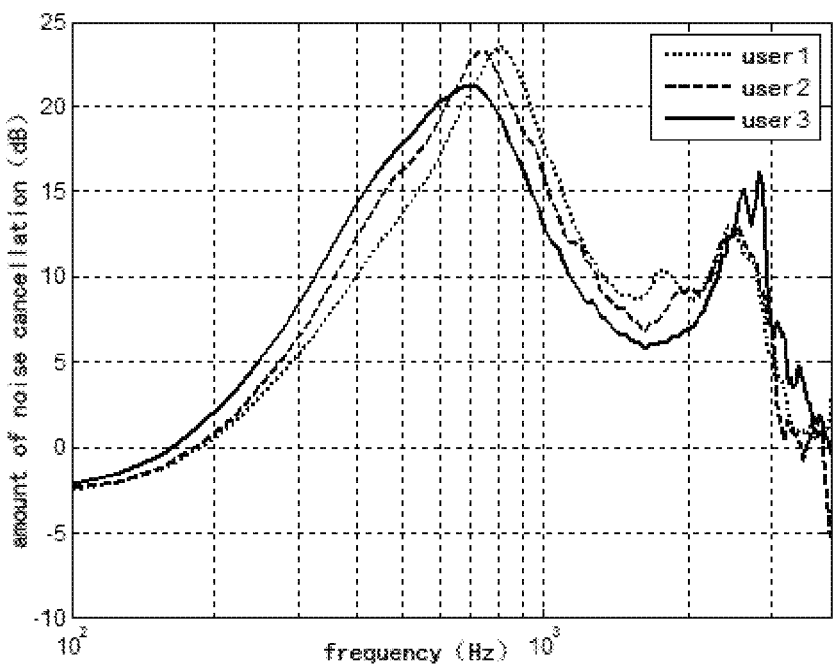
FIG. 12 is a comparison schematic diagram of noise reduction effects for different users who apply the smart control according to the present invention.

FIG. 12 is a schematic diagram for comparison of noise reduction effects for different users after applying the smart control provided in the present invention. As shown in FIG. 12, noise reduction performance for different users differ little from each other after the intelligent feedback control according to the present invention is performed. As compared with FIG. 5, which shows the noise reduction effect that can be achieved by different users using the same circuit H when applying conventional feed-forward active noise control technology, it is obvious that it is possible to keep the consistency in noise reduction performance by applying the intelligent feedback control method according to the present invention to conventional feed-forward active noise control technology.

In the above, an smart control method and device for non-closed feed-forward active noise cancellation, a noise canceling method and a non-closed feed-forward active noise canceling system for non-closed feed-forward active noise cancellation, and a communication equipment equipped with the above-mentioned non-closed feed-forward active noise canceling system according to the present invention have been described as examples with reference to the drawings. However, those skilled in the art should understand that for the smart control method and device used in non-closed feed-forward active noise cancellation, the noise canceling method and a non-closed feed-forward active noise canceling system for non-closed feed-forward active noise cancellation, and the communication equipment with the above-mentioned non-closed feed-forward active noise canceling system proposed in the present invention, various modifications may be made to them without departing from the scope of the present invention. Therefore, the scope of the present invention should be defined by contents of the appended claims.

What is claimed is:

1. A non-closed feed-forward active noise canceling method, comprising:
    picking up an outside noise signal away from ears;
    subjecting the picked outside noise signal to feed-forward active noise cancellation to generate an anti-noise signal for balancing out said outside noise signal;
    mixing the generated anti-noise signal and a voice signal received at the receiving end of the communication equipment; and
    feeding the mixed signal into the ears to balance out the outside noise signal entering the ears via free space,
    wherein, when it is detected that there is no voice signal output at the receiving end of said communication equipment, regulating the parameters of the control circuit used in said feed-forward active noise cancellation,
    wherein, the step of when it is detected there is no voice signal output at a receiving end of a communication equipment, regulating the parameters of the control circuit used in said feed-forward active noise cancellation comprises:
        receiving an outside noise signal from a reference microphone away from the ears and a detection signal from a monitoring microphone near the ears;
        within a band range of 500 Hz~1 kHz, analyzing the performance of said received outside noise signal and said detection signal to estimate a noise reduction performance curve about the noise reduction performance after said feed-forward active noise cancellation; and
        regulating parameters of the control circuit used for said feed-forward active noise cancellation according to the estimated noise reduction performance curve and a preset noise reduction performance curve, so as to, within the band range of 500 Hz~1 kHz, make a difference between said estimated noise reduction performance curve and said preset noise reduction performance curve within a preset range, and
    wherein the parameters of said control circuit comprise a gain factor and phase adjustment parameters.

2. The non-closed feed-forward active noise canceling method of claim 1, wherein regulating parameters of the control circuit used for said feed-forward active noise cancellation according to said estimated noise reduction performance curve and the preset noise reduction performance curve comprises:
    comparing said estimated noise reduction performance curve with the preset noise reduction performance curve to determine regulation direction in which parameters of said control circuit need to be regulated; and
    regulating parameters of said control circuit according to the determined regulation direction, wherein,
    said regulation process for parameters of the control circuit applies feedback control, and each time after regulation, comparing whether said estimated noise reduction performance curve approaches closer to said preset noise reduction performance curve; if so, maintaining the regulation direction, if not, reversing said regulation direction, until the difference between said estimated noise reduction performance curve and said preset noise reduction performance curve is within said preset range.

3. The non-closed feed-forward active noise canceling method of claim 1, wherein detecting whether there is any voice signal output at the receiving end of the communication equipment is implemented by calculating correlation between said outside noise signal and said detection signal or determining the value of energy of output signal of said receiving end.

4. The non-closed feed-forward active noise canceling method of claim 3, wherein detecting whether there is any voice signal output at the receiving end of said communication equipment by calculating the correlation between said outside noise signal and said detection signal comprises:
   subjecting signals picked by said reference microphone and said monitoring microphone to framing processing respectively;
   calculating the correlation between two frames of data having been subjected to said framing; and
   comparing the calculated correlation with a predetermined threshold to determine the correlation between signals picked respectively by said reference microphone and said monitoring microphone.

5. A device for non-closed feed-forward active noise cancellation, comprising:
   a reference microphone configured to pick up an outside noise signal away from ears;
   an anti-noise signal generating unit configured to subject the picked outside noise signal to feed-forward active noise cancellation to generate an anti-noise signal for balancing out said outside noise signal;
   a signal mixing unit configured to mix said anti-noise signal and a voice signal received at the receiving end of the communication equipment;
   a feed-in unit configured to feed the mixed signal into the ears;
   a monitoring microphone configured to pick up the detection signal near the ears, said detection signal being a signal obtained by superposing, at the ears, the outside noise signal entering the ears via free space and the output signal of said feed-in unit; and
   a smart control device, configured to regulate parameters of the control circuit for feed-forward active noise cancellation of said anti-noise signal generating unit when there is no voice signal output is detected at said receiving end of the communication equipment,
   wherein the smart control device comprises:
      a detecting unit configured to detect whether there is any voice signal output at the receiving end of the communication equipment;
      a receiving unit configured to, when it is detected there is no voice signal output at said receiving end of a communication equipment, receive an outside noise signal from a reference microphone away from the ears and a detection signal from a monitoring microphone near the ears;
      a noise reduction performance estimating unit configured to implement performance analysis, within a band range of 500 Hz~1 kHz, on said received outside noise signal and said detection signal to estimate a noise reduction performance curve after said feed-forward active noise cancellation; and
      a first regulating unit configured to regulate parameters of the control circuit in said feed-forward active noise cancellation according to said estimated noise reduction performance curve and the preset noise reduction performance curve, so as to, within the band range of 500 Hz~1 kHz, make a difference between said estimated noise reduction performance curve and said preset noise reduction performance curve within a preset range.

6. The device for non-closed feed-forward active noise cancellation according to claim 5, wherein said first regulating unit comprises:
   a regulation direction determining module configured to compare said estimated noise reduction performance curve with the preset noise reduction performance curve to determine regulation direction in which the parameters of said control circuit need to be regulated; and
   a second regulating module configured to regulate parameters of said control circuit according to the determined regulation direction;
   wherein said regulation process for parameters of the control circuit applies feedback control, and each time after regulation, comparing again whether said estimated noise reduction performance curve approaches closer to said preset noise reduction performance curve; if so, maintaining the regulation direction, if not, reversing said regulation direction, until the difference between said estimated noise reduction performance curve and said preset noise reduction performance curve is within said preset range.

7. The device for non-closed feed-forward active noise cancellation of claim 5, wherein said detecting unit determines whether there is any voice signal output at said receiving end by calculating the correlation of signals picked respectively by said reference microphone and said monitoring microphone or by detecting the value of energy of output signal at said receiving end.

8. The device for non-closed feed-forward active noise cancellation of claim 7, wherein when said detecting unit determines whether there is any voice signal output at said receiving end by calculating the correlation of signals picked by said reference microphone and said monitoring microphone, said detecting unit further comprises:
   a framing sample module configured to subject signals picked by said reference microphone and said monitoring microphone to framing processing respectively;
   a computation module configured to calculate the correlation between two frames of data after said framing; and
   a correlation determining module configured to compare the calculated correlation with a predetermined threshold to determine the correlation between signals picked by said reference microphone and said monitoring microphone.

9. A communication equipment comprising the device for non-closed feed-forward active noise cancelation according to claim 5, and the smart control device comprises:
   a detecting unit configured to detect whether there is any voice signal output at the receiving end of the communication equipment;
   a receiving unit configured to, when it is detected there is no voice signal output at said receiving end of a communication equipment, receive an outside noise signal from a reference microphone away from the ears and a detection signal from a monitoring microphone near the ears;
   a noise reduction performance estimating unit configured to implement performance analysis on said received outside noise signal and said detection signal to estimate a noise reduction performance curve after said feed-forward active noise cancellation; and
   a first regulating unit configured to regulate parameters of the control circuit in said feed-forward active noise cancellation according to said estimated noise reduction performance curve and the preset noise reduction performance curve, so as to make a difference between said estimated noise reduction performance curve and said preset noise reduction performance curve within a preset range.

10. The communication equipment of claim 9, wherein, the first regulating unit comprises:
   a regulation direction determining module configured to compare the estimated noise reduction performance curve with the preset noise reduction performance curve to determine the direction in which parameters of said control circuit need to be regulated; and
   a second regulating module configured to regulate parameters of said control circuit according to the determined regulation direction;
   wherein, the regulation process of control circuit parameters adopts feedback control, each time after the parameters are regulated, the estimated noise reduction performance curve is compared with the said preset noise reduction performance curve to determine whether they are closer; if yes, the regulation will be maintained in the same direction, if not, the regulation direction is reversed, until the difference between the estimated noise reduction performance curve and the preset noise reduction performance curve is within a preset range.

11. The communication equipment of claim 9, wherein, said detecting unit determines whether there is any voice signal output at said receiving end by calculating the correlation of signals picked respectively by said reference microphone and said monitoring microphone or by detecting the value of energy of output signal at said receiving end.

12. The communication equipment of claim 11, wherein the detecting unit further comprises:
   a framing sample module configured to subject signals picked by said reference microphone and said monitoring microphone to framing processing respectively;
   a computation module configured to calculate the correlation between two frames of data after said framing; and
   a correlation determining module configured to compare the calculated correlation with a predetermined threshold to determine the correlation between signals picked by said reference microphone and said monitoring microphone.

* * * * *